United States Patent
Yang et al.

(10) Patent No.: US 10,173,846 B2
(45) Date of Patent: Jan. 8, 2019

(54) SCRAPER CONVEYOR CHAIN TENSIONING DEVICE HAVING SWEEPING FUNCTION

(71) Applicant: CHINA UNIVERSITY OF MINING AND TECHNOLOGY, Jiangsu (CN)

(72) Inventors: Shanguo Yang, Jiangsu (CN); Wei Li, Jiangsu (CN); Ning Jia, Jiangsu (CN); Qingwei Ben, Jiangsu (CN); Linjiang Xia, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 15/564,659

(22) PCT Filed: Dec. 29, 2015

(86) PCT No.: PCT/CN2015/099335
§ 371 (c)(1),
(2) Date: Oct. 5, 2017

(87) PCT Pub. No.: WO2016/169294
PCT Pub. Date: Oct. 27, 2016

(65) Prior Publication Data
US 2018/0079598 A1    Mar. 22, 2018

(30) Foreign Application Priority Data
Apr. 23, 2015 (CN) .......................... 2015 1 0197507

(51) Int. Cl.
*B65G 45/14* (2006.01)
*B65G 45/12* (2006.01)
(Continued)

(52) U.S. Cl.
CPC ............. *B65G 45/14* (2013.01); *B65G 19/08* (2013.01); *B65G 19/18* (2013.01); *B65G 23/44* (2013.01);
(Continued)

(58) Field of Classification Search
None
See application file for complete search history.

(56) References Cited

U.S. PATENT DOCUMENTS 3,516,535 A * 6/1970 Patz ...................... B65G 45/14
198/498
4,858,747 A * 8/1989 Eunson .................. B65G 43/06
198/718

FOREIGN PATENT DOCUMENTS

CN    201415856 Y    3/2010
CN    203143490 U    8/2013
(Continued)

*Primary Examiner* — Kavel Singh
(74) *Attorney, Agent, or Firm* — Saliwanchik, Lloyd & Eisenschenk

(57) ABSTRACT

A scraper conveyor chain tensioning device having a sweeping function, comprising a transmission device (2), a steering chain wheel (3), scraper chains (4), and ledges (5), wherein a chain tensioning device (1) is arranged above the scraper chains (4) arranged at the side of the steering chain wheel (3), the chain tensioning device (1) is provided with a sweeping device (12), the chain tensioning device (1) comprises a slider-crank mechanism and two chutes (13) symmetrically fixed to the ledges (5) on two sides at an inclined angle, a tensioning shaft (19) is arranged between the two chutes (13), the tensioning shaft (19) is arranged on a bearing seat (18) via a bearing, and the middle part of the tensioning shaft (19) is provided with a tensioning chain wheel (11) matching with a transmission chain; and the sweeping device (12) comprises a tensioning shaft sleeve (12-3), a plurality of groups of sweeping heads (12-2) is arranged on the circumference of the tensioning shaft sleeve (12-3) at intervals, and the sweeping heads (12-2) are fixed to the tensioning shaft sleeve (12-3) via springs (12-1). Caking coal on a scraper can be swept via scraping teeth on sweeping heads (12-2), the problems of friction, chain (Continued)

jumping and jamming caused by the caking coal on the scraper are solved, the scraper conveyor chain tensioning device is applicable to a middle double-chain scraper conveyor, the change on an original scraper conveyor is small, and pure mechanical transmission is adopted, thereby being simple in mechanism, convenient to assemble and disassemble, and reliable in operation.

3 Claims, 4 Drawing Sheets

(51) Int. Cl.
    *B65G 45/16*     (2006.01)
    *B65G 23/44*     (2006.01)
    *B65G 19/08*     (2006.01)
    *B65G 19/18*     (2006.01)
    *B65G 19/04*     (2006.01)
    *B65G 23/06*     (2006.01)

(52) U.S. Cl.
    CPC .............. *B65G 19/04* (2013.01); *B65G 23/06* (2013.01); *B65G 2201/04* (2013.01)

(56) References Cited

FOREIGN PATENT DOCUMENTS

| | | |
|---|---|---|
| CN | 203439602 U | 2/2014 |
| CN | 203624398 U | 6/2014 |
| CN | 103979265 A | 8/2014 |
| CN | 104743326 A | 1/2015 |
| DE | 2500009 A1 | 7/1976 |
| JP | 2011079651 A | 4/2011 |

\* cited by examiner

SCRAPER CONVEYOR CHAIN TENSIONING DEVICE HAVING SWEEPING FUNCTION

CROSS REFERENCE TO RELATED APPLICATIONS

This application is a National Stage Application of International Application Number PCT/CN2015/099335, filed Dec. 29, 2015.

I. FIELD OF THE INVENTION

The present invention relates to the field of conveying equipment for coal mining, in particular to a scraper conveyer chain tensioning device having a sweeping function.

II. BACKGROUND OF THE INVENTION

As an important transportation equipment for coal mining face, a scraper conveyer not only attains a function of loading and transporting the material, but also serves as a pushing fulcrum for the coal loading and operation track of the coal cutter and the hydraulic support. Therefore, whether the scraper conveyer operates reliably, safely and efficiently has direct influence on the production efficiency of downhole coal mining and the economic benefit and development of the coal mining enterprise.

As the conveying capacity of scraper conveyer is gradually increased and the laying length of scraper conveyer is greatly increased, the coal load borne on the scraper chains becomes higher and higher. The scraper chains are not absolutely rigid bodies; instead, the scraper chains are elongated elastically as the load on the chains is increased, and thereby result in a loose chain phenomenon. Since loose scraper chains may cause an off-chain, blocked chain, broken chain situation, etc., the production along the fully-mechanized mining face may be affected. Therefore, the scraper chains must be tensioned up in due course.

At present, there are mainly two chain tensioning methods in China: one is manual chain tensioning and the other one is hydraulic chain tensioning. Manual chain tensioning is to break the chains and remove several chains from the chains manually when the chains become loose obviously. This method is very inefficient and involves high labor intensity, and the machine has to be shut down before the manual chain tensioning process can be commenced. Consequently, the operation time of the machine is severely shortened, and the economic benefit is affected. Hydraulic chain tensioning is mainly to adjust the center distance between the chain wheels under the action of a hydraulic cylinder and thereby to achieve tension up of the scraper chains. Though the method can attain an automatic tensioning effect theoretically, the practical application result is not ideal, as hydraulic control elements may fail easily under harsh downhole conditions. In addition, that method involves high system cost, troublesome maintenance process and high maintenance cost. Therefore, the hydraulic chain tensioning method is not widely applied in medium-sized and small-sized coal mines.

Besides, since the coal conveyed on the scraper conveyer is unloaded by gravity at the head of the scraper conveyer, it is impossible to fully unload the coal, and the residual coal may remain at the corners of the scraper or along the middle chute. The residual coal on the scraper aggravates the wearing of the scraper conveyer on one hand, and increases the operation burden on the equipment on the other hand. Consequently, the scraper conveyer does more idle work and its efficiency is severely decreased. The residual coal may even enter into the chain wheels and results in a chain jumping, chain breaking accident.

III. CONTENTS OF THE INVENTION

Technical Problem

To overcome the drawbacks in the prior art, the present invention provides a scraper conveyer chain tensioning device having a sweeping function, which tensions up the chains on the lower part of the chute by altering the position of a tensioning sprocket and sweeps the scraper passing by the tensioning sprocket at the same time, so as to accomplishing automatic cleaning of the scraper and improve the coal conveying efficiency of the scraper conveyer.

Technical Scheme

The scraper conveyer chain tensioning device having a sweeping function provided in the present invention comprises a transmission device disposed at the tail of a scraper conveyer, a steering sprocket, scraper chains and ledges, the steering sprocket is driven via by the transmission device, the scraper chains are meshed with the steering sprocket at the tail of the scraper conveyer and are steered along with the rotation of sprocket; a chain tensioning device is provided above the scraper chains at the side of the steering sprocket, and a sweeping device is provided on the chain tensioning device; the chain tensioning device comprises a slider-crank mechanism and two chutes fixed to the ledges at an inclination angle symmetrically, a tensioning shaft provided between the two chutes and mounted via a bearing on a bearing seat, and a tensioning sprocket that works with the transmission chains is provided on the middle part of the tensioning shaft; the slider-crank mechanism comprises link rods, a crank, a welded rod and sliders, the number of link rods are two and one end of the link rods are hinged to shaft shoulders at two sides of the tensioning shaft respectively and the other one end of the link rods are hinged to the crank respectively, the crank is rigidly fixed via one cross rod and extend out of the ledges via arc grooves of the ledges, and the crank is hinged to the welded rod via two longitudinal rods connected to the cross rod, the two ends of the welded rod are fixed to the two chutes respectively, one slider is arranged in each of the two chutes respectively, and the sliders are wedged to the bearing seat, so that the bearing seat and the sliders are fixed in relation to each other; the sweeping device comprises a tensioning shaft sleeve arranged on two sides of the tensioning sprocket, the tensioning shaft sleeve fixedly connected to the tensioning shaft via a key joint, a plurality of groups of sweeping heads are arranged at an interval on the circumference of the tensioning shaft sleeve, and the sweeping heads are fixed via springs to the tensioning shaft sleeve.

The number of plurality of groups of sweeping heads is 4-8 groups, and each group of sweeping heads consists of 2-4 sweeping heads.

Scraping teeth are distributed on each of the sweeping heads.

Benefits

In the present invention, a chain tensioning function and a sweeping function are integrated in one mechanism, the device provided in the present invention can be mounted into an existing scraper conveyer and is ready to use simply after a segment of the chute at the tail part of the scraper conveyer is removed and threaded holes and arc grooves are drilled out in the ledges. Therefore, the device can be mounted and removed conveniently, without any disturbance to the original operating condition of the scraper conveyer. The device is rigidly connected and employs a mechanical principle solely. Therefore, an oil leakage problem introduced by tensioning with a hydraulic cylinder can be avoided. A slider-crank mechanism is utilized to drive a tensioning sprocket to move to achieve tension up of the chains, the slack condition of the scraper conveyer chain can be observed on site, and the crank can be turned to adjust the position of the tensioning sprocket; the slider-crank mechanism is welded together via a steel rod, and the sliders can be moved synchronously without a control system; thus, the problem of out-of-synchronization between the two sides of a tensioning device implemented with a hydraulic cylinder can be avoided. The device employs a mechanical lock means, which provides a locking function simply after a pin rod is inserted into pin holes in the crank and the ledges. Therefore, the device is safer and more reliable. Furthermore, the scraping teeth on the sweeping heads of a sweeping device on the rotating shaft scrape off the coal that adheres to the scraper when the scraper passes by; in addition, the sweeping effect is enhanced by the vibration produced by the springs. Thus, the device solves problems of friction, chain jumping and chain blocking incurred by the coal that adheres to the scraper; the chain tensioning sprocket is meshed with the chains, and can reduce the acting force and friction exerted by the chains on the sprocket and thereby prolongs the service life of the sprocket. The device provided in the present invention is especially applicable to double-chain scraper conveyers and requires little renovation to the existing scraper conveyers. The device employs mechanical transmission solely, does not require a control system, has a simple mechanism, is easy to mount and remove, operates reliably, is free of maintenance, and has wide practicability.

IV. DESCRIPTION OF THE DRAWINGS

Figure 1:
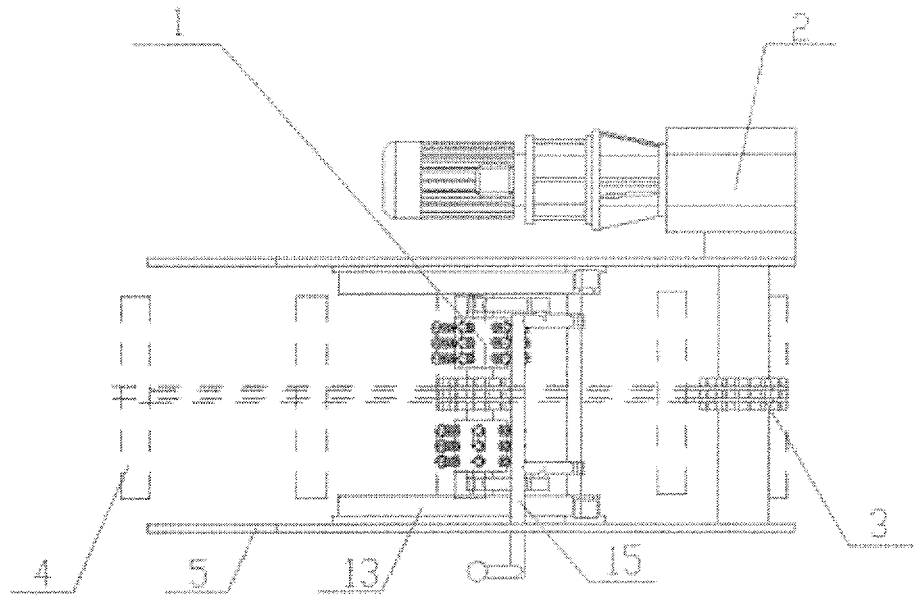
FIG. 1 is an assembly diagram of the chain tensioning device according to the present invention.

In the figures: 1. chain tensioning device; 2—transmission device; 3—steering sprocket; 4—scraper chain; 5—ledge; 11—tensioning sprocket; 12—sweeping device; 13—chute; 14—link rod; 15—crank; 16—welded rod; 17—slider; 18—bearing seat; 19—tensioning shaft; 12-1—spring; 12-2—sweeping head; 12-3—tensioning shaft sleeve

V. DETAILED DESCRIPTION OF THE EMBODIMENTS

Hereunder the present invention will be further detailed in an embodiment with reference to the accompanying drawings.

The scraper conveyer chain tensioning device having a sweeping function provided in the present invention comprises a transmission device 2 disposed at the tail of a scraper conveyer, a steering sprocket 3, scraper chains 4 and ledges 5, the steering sprocket 3 is driven via the transmission device 2, the scraper chains 4 are meshed with the steering sprocket 3 at the tail of the scraper conveyer and are steered along with the rotation of sprocket; a chain tensioning device 1 is provided above the scraper chains 4 at the side of the steering sprocket 3, and a sweeping device 12 is provided on the chain tensioning device 1; the chain tensioning device 1 comprises a slider-crank mechanism and two chutes 13 fixed to the ledges 5 at an inclination angle symmetrically, one tensioning shaft 19 provided between the two chutes 13 and mounted via a bearing on a bearing seat 18, and a tensioning sprocket 11 that works with the transmission chains is provided on the middle part of the tensioning shaft 19; the slider-crank mechanism comprises link rods 14, a crank 15, a welded rod 16 and sliders 17, the number of link rods 14 are two and one end of the link rods 14 are hinged to shaft shoulders at two sides of the tensioning shaft 19 respectively and the other one end of the link rods 14 are hinged to the crank 15 respectively, the crank 15 is rigidly fixed via one cross rod and extend out of the ledges 5 via arc grooves of the ledges, and the crank 15 is hinged to the welded rod 16 via two longitudinal rods connected to the cross rod, the two ends of the welded rod 16 are fixed to the two chutes 13 respectively, one slider 17 is arranged in each of the two chutes 13 respectively, and the sliders 17 are wedged to the bearing seat 18, so that the bearing seat 18 and the sliders 17 are fixed in relation to each other; the sweeping device comprises a tensioning shaft sleeve 12-3 arranged on two sides of the tensioning sprocket 11, the tensioning shaft sleeve 12-3 fixedly connected to the tensioning shaft 19 via a key joint, a plurality of groups of sweeping heads 12-2 are arranged on the circumference of the tensioning shaft sleeve 12-3 at an interval, the number of plurality of groups of sweeping heads 12-2 are 4-8 groups, and each group of sweeping heads 12-2 consists of 2-4 sweeping heads, and scraping teeth are distributed on each of the sweeping heads 12-2. The sweeping heads 12-2 are fixed to the tensioning shaft sleeve 12-3 via springs 12-1. The basic parameters of the tensioning sprocket 11 are consistent with the parameters of the sprocket of the scraper conveyer. In the return process, the scraper chains 4 are steered via the steering sprocket 3 and then meshed with the tensioning sprocket 11, and to achieve tension up of scraper chain by moving the tensioning sprocket 11.

Figure 3:
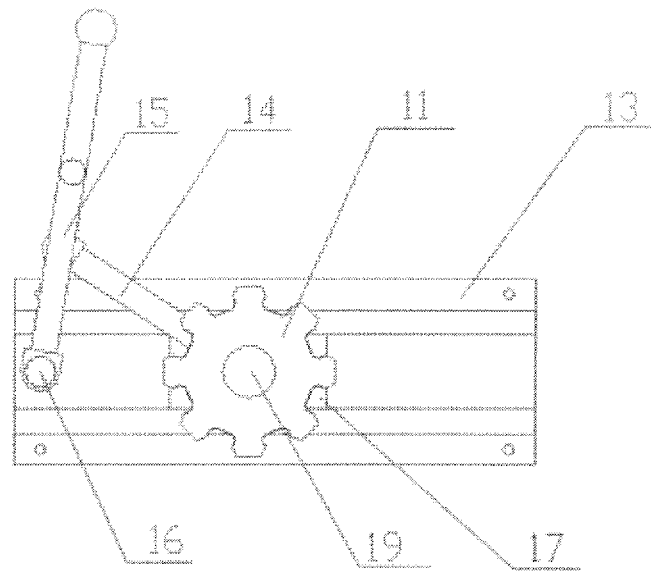
FIG. 3 is a schematic diagram of the slider-crank mechanism in the chain tensioning device according to the present invention.

As shown in FIGS. 1 and 3, the device provided in the present invention is mainly composed of a transmission device 2 disposed at the tail of the scraper conveyer, a steering sprocket 3, scraper chains 4, ledges 5 and a scraper conveyer chain tensioning device 1; the scraper conveyer chain tensioning device comprises chutes 13, sliders 14, a bearing seat 18, a slider-crank mechanism, a tensioning sprocket 11, a tensioning shaft 19 and a sweeping device 12. The steering sprocket 3 at the tail of the scraper conveyer is driven by the transmission device 2, and the scraper chains 4 are meshed with the steering sprocket 3 at the tail of the scraper conveyer and are rotated along with the sprocket, then scraper chain is steered.

Figure 2:
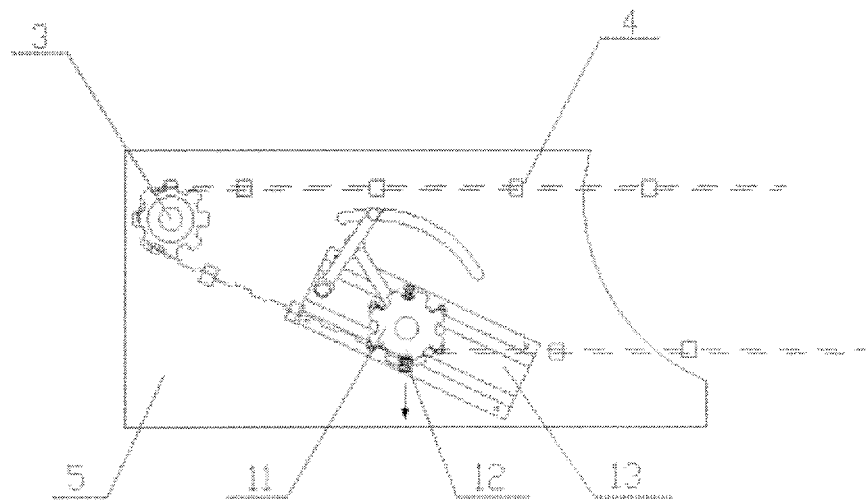
FIG. 2 is a schematic layout diagram of the chain tensioning device according to the present invention.

As shown in FIGS. 2 and 3, the chutes 13 are fixed to the ledges 5 by bolts at an inclination angle of 30°-50°, and two chutes are connected with each other via one welded rod 16 between them, so that to achieve the synchronously movement of the two chutes; the end of the chute which near the steering sprocket cannot be higher than the elevation of the scraper chains 4 on the upper part of the scraper conveyer, to prevent that the movement of the scraper chains is jammed by the chutes.

Figure 4:
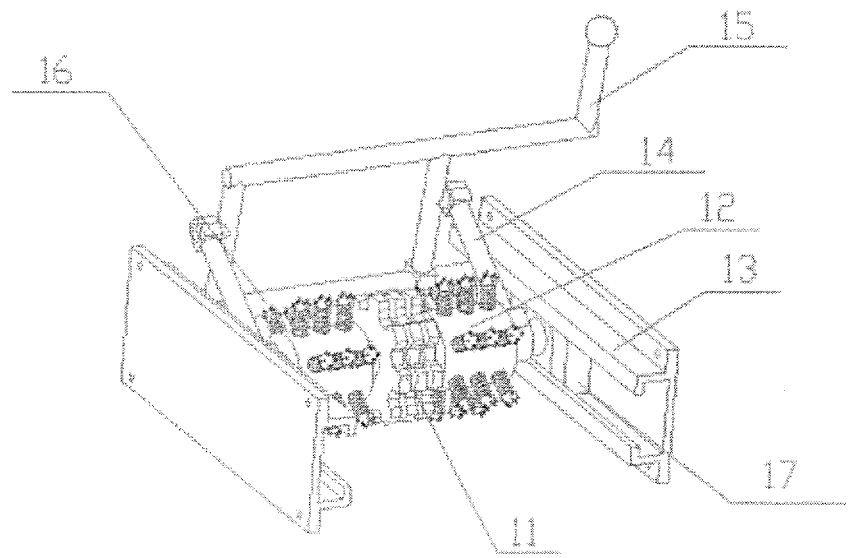
FIG. 4 is an isometric view of the mechanism of the chain tensioning device according to the present invention.

As shown in FIG. 4, the sliders 17 are made of a wear-resistant material polyurethane and are fitted with the chutes 13, and the sliders are wedged into the bearing seat 18, so that the bearing seat and the sliders are relatively fixed to each other. The tensioning shaft 10 is connected to the tensioning sprocket 11 via a key joint, the sweeping device 12 is mounted at the two sides of the tensioning sprocket symmetrically, is positioned by shaft shoulders and hinged to link rods 14, and a bearing is mounted on the bearing seat and fitted with the tensioning shaft. The basic parameters of the tensioning sprocket are consistent with the parameters of the steering sprocket 3 of the scraper conveyer. In the return process, the scraper chains are steered via the steering sprocket and meshed with the tensioning sprocket, and to achieve tension up of the scraper chain by moving the tensioning sprocket.

Figure 5:
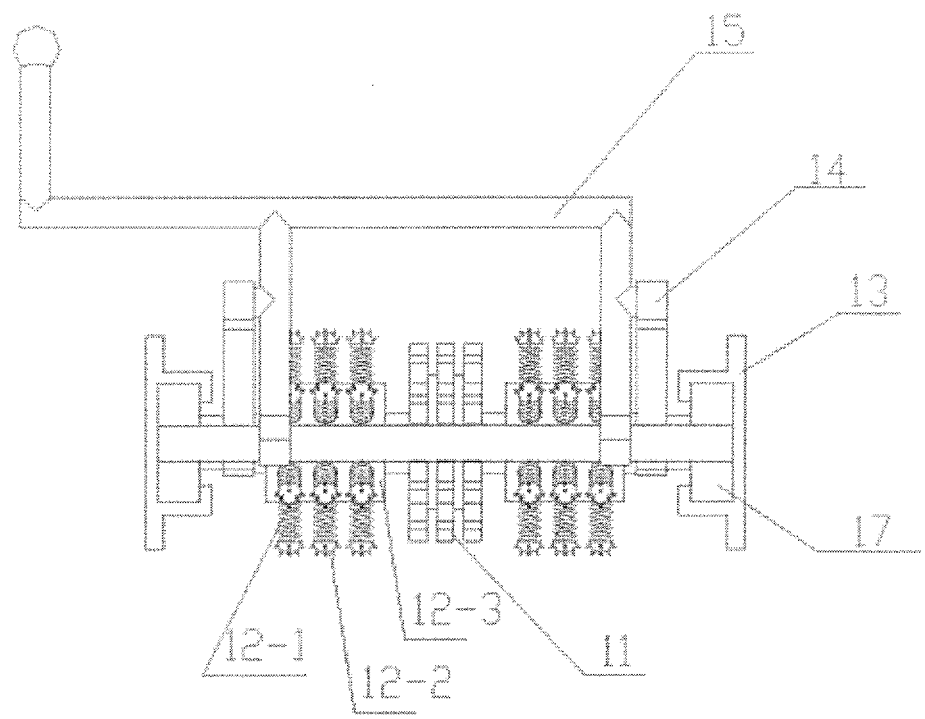
FIG. 5 is a reference arrow view of the chain tensioning device according to the present invention.
Figure 6:
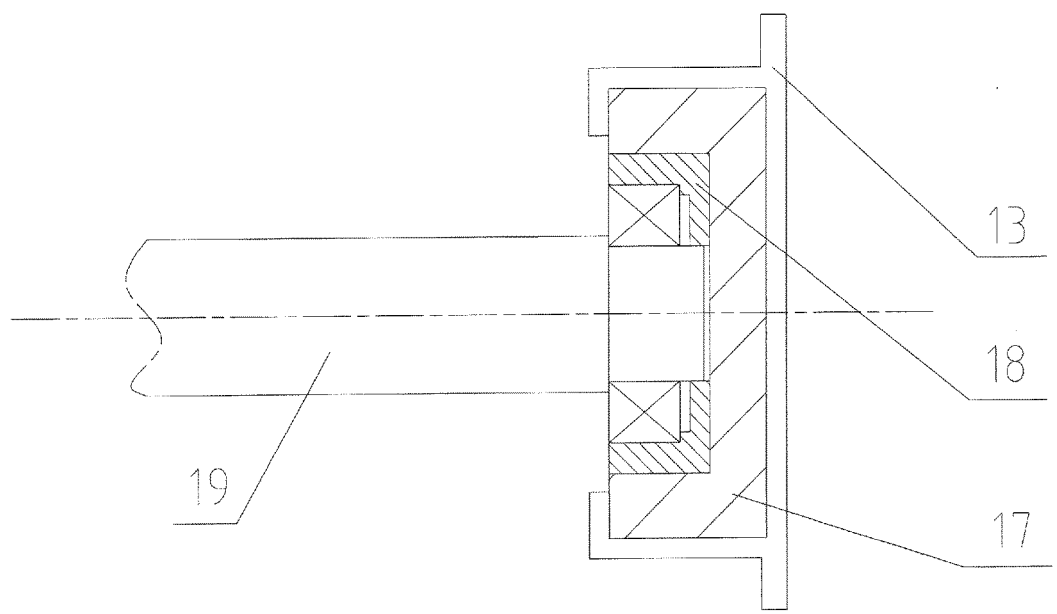
FIG. 6 is a schematic diagram of the bearing seat according to the present invention.

As shown in FIG. 5, the sweeping device 12 comprises springs 12-1, sweeping heads 12-2 and a tensioning shaft sleeve 12-3, the sweeping device is fixed to the tensioning shaft 19 via a key joint, the sweeping heads 12-2 are distributed on the outer surface of the tensioning shaft sleeve 12-3, the sweeping heads 12-2 are fixed to the tensioning shaft sleeve 12-3 via the springs 12-1, and scraping teeth are distributed on the sweeping heads 12-2.

As shown in FIGS. 2 and 5, one end of link rods 14 of the slider-crank mechanism are hinged to the tensioning shaft 19, the crank 15 is hinged to the welded rod 16 in middle of the chutes 13, and the crank at the two sides is rigidly fixed via one cross rod and extend out of the ledges 5 via arc grooves of the ledges.

Working principle: In the present invention, the scraper chains are tensioned up by adjusting the position of the tensioning sprocket, to alter the degree of curvature of the scraper chains on the lower part of the scraper conveyer. The displacement of the tensioning sprocket 11 is driven by the movement of the sliders 17 effected by the rotation of the crank and then drive the tensioning sprocket 11 to move. The cleaning function of the device is implemented by the sweeping device mounted on the tensioning shaft 19; when the scraper passes by the tensioning sprocket 11 along with the chains, the sweeping heads 12-2 act on the scraper, and the scraping teeth distributed on the sweeping heads 12-2 scrape off the coal that adheres to the scraper; in addition, the vibration generated by the collision between the springs 12-1 and the scraper also attains a coal cleaning effect to some extent. The position of the tensioning sprocket 11 is fixed by a pin rod. When the tensioning sprocket 11 is adjusted to an appropriate tensioning position, the crank 15 is also at a proper corresponding position. At that point, a pin rod can be inserted into the pin holes in the crank and the ledges to lock up the tensioning device.

Working process: In the present invention, a part of the chutes in front of the tail of an existing double-chain scraper conveyer is removed, and the device provided in the present invention is mounted there. The scraper chains pass by the tensioning sprocket 19 before they pass by the steering sprocket and steered. If any loose chain phenomenon is found, the pin rod may be pulled out from the ledges, and the crank 15 may be turned so that the tensioning sprocket 19 is displaced downward along with the sliders 17; under the action of the tensioning sprocket 11, the scraper chains are curved down, so that a chain tensioning effect is attained.

When the tensioning sprocket is adjusted to a position where the chains are tensioned up properly, the pin rod may be inserted into the pin holes in the ledges corresponding to the pin hole in the tensioning sprocket, so that the mechanism is locked up against movement.

When the scraper passes by the sweeping device along with the chains, the scraper not only is subjected to the action of the scraping teeth on the sweeping heads, but also is subjected to the collision by the springs and thereby generates vibration; thus, a purpose of cleaning the scraper is attained. If the scraper chains are severely worn or elongated and have to be replaced or removed for service, the crank may be turned to its original position simply.

The invention claimed is:

1. A scraper conveyer chain tensioning device having a sweeping function, comprising:
   a transmission device disposed at a tail end of a scraper conveyer;
   a steering sprocket configured to be driven by the transmission device;
   scraper chains configured to be meshed with the steering sprocket at the tail end of the scraper conveyer and configured to be steered along with the rotation of the steering sprocket;
   two ledges;
   a chain tensioning device disposed above the scraper chains at a side of the steering sprocket; and
   a sweeping device on the chain tensioning device,
   wherein the chain tensioning device comprises:
   a slider-crank mechanism,
   two chutes connected to and each respectively protruding inward from the two ledges at an inclination angle, symmetrically,
   one tensioning shaft disposed between the two chutes and mounted via a bearing on a bearing seat, and
   a tensioning sprocket configured to be meshed with the scraper chains, and disposed on the middle part of the tensioning shaft;
   wherein the slider-crank mechanism comprises:
   two link rods,
   a crank,
   a welded rod, and
   two sliders,
   wherein one end of each respective link rod is hinged to a shaft shoulder at a side of the tensioning shaft and the other end of each respective link rod is hinged to the crank,
   wherein the crank is rigidly fixed via one cross rod and extends out of the two ledges via arc grooves of the two ledges, and
   wherein the crank is hinged to the welded rod via two longitudinal rods connected to the cross rod, the two ends of the welded rod are fixed to the two chutes respectively, wherein each slider of the two sliders is disposed in one chute of the two chutes respectively, and
   wherein each slider of the two sliders is wedged to a bearing seat, respectively that the respective bearing seat and the slider are fixed in relation to each other;
   wherein the sweeping device comprises:
   a tensioning shaft sleeve arranged on two sides of the tensioning sprocket, the tensioning shaft sleeve connected to the tensioning shaft via a key joint,
   a plurality sweeping heads respectively arranged at an interval on the circumference of and protruding outward from the tensioning shaft sleeve, and
   wherein each sweeping head of the plurality of sweeping heads is respectively fixed via a spring to the tensioning shaft sleeve.

2. The scraper conveyer chain tensioning device having a sweeping function according to claim 1, wherein plurality sweeping heads are arranged in 4-8 groups of sweeping heads, and wherein each respective group of sweeping heads consists of 2-4 sweeping heads.

3. The scraper conveyer chain tensioning device having a sweeping function according to claim 1, wherein, scraping teeth are disposed on each respective sweeping head of the plurality of sweeping heads.

\* \* \* \* \*